United States Patent
Fan et al.

(10) Patent No.: US 12,231,596 B2
(45) Date of Patent: Feb. 18, 2025

(54) CHARGING IN DEVICE-TO-DEVICE COMMUNICATIONS OVER PC5 FOR INTERACTIVE SERVICES

(71) Applicant: NEC Corporation, Tokyo (JP)

(72) Inventors: Linghang Fan, Woking Surrey (GB); Iskren Ianev, Lower Earley (GB); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 94 days.

(21) Appl. No.: 17/627,176

(22) PCT Filed: Sep. 28, 2020

(86) PCT No.: PCT/JP2020/036648
§ 371 (c)(1),
(2) Date: Jan. 14, 2022

(87) PCT Pub. No.: WO2021/065804
PCT Pub. Date: Apr. 8, 2021

(65) Prior Publication Data
US 2022/0279075 A1    Sep. 1, 2022

(30) Foreign Application Priority Data
Sep. 30, 2019   (EP) .................................. 19200645

(51) Int. Cl.
*H04M 15/00* (2024.01)
*H04W 4/24* (2018.01)
*H04W 92/18* (2009.01)

(52) U.S. Cl.
CPC .......... *H04M 15/66* (2013.01); *H04M 15/41* (2013.01); *H04M 15/8033* (2013.01); *H04W 4/24* (2013.01); *H04W 92/18* (2013.01)

(58) Field of Classification Search
CPC ................. H04M 15/66; H04M 15/41; H04M 15/8033; H04W 4/24; H04W 92/18
See application file for complete search history.

(56) References Cited

U.S. PATENT DOCUMENTS

| | | | |
|---|---|---|---|
| 10,542,399 B2 * | 1/2020 | Kim | H04W 4/40 |
| 10,952,046 B2 * | 3/2021 | Lee | H04W 4/12 |
| 11,102,649 B2 * | 8/2021 | Jost | H04W 12/104 |
| 11,122,415 B2 * | 9/2021 | Lee | H04W 8/08 |
| 11,206,541 B2 * | 12/2021 | Wang | H04W 12/122 |
| 2012/0020345 A1 | 1/2012 | Zhou et al. | |
| 2017/0201904 A1 * | 7/2017 | Lee | H04W 76/27 |
| 2017/0288886 A1 * | 10/2017 | Atarius | H04L 47/20 |

(Continued)

FOREIGN PATENT DOCUMENTS

| | | |
|---|---|---|
| CN | 110169160 A | 8/2019 |
| WO | 2010/121460 A1 | 10/2010 |

(Continued)

OTHER PUBLICATIONS

JP Office Action for JP Application No. 2022-505500, mailed on May 9, 2023 with English Translation.

(Continued)

*Primary Examiner* — Akelaw Teshale

(57) ABSTRACT

A new charging solution is proposed for D2D direct communication based on 5GS, which allows the network to charge UE's usage accurately and flexibly.

3 Claims, 15 Drawing Sheets

Charging reporting for traffic over PC5 via the PCF

(56) References Cited

U.S. PATENT DOCUMENTS

| | | | |
|---|---|---|---|
| 2017/0289855 A1* | 10/2017 | Xu | H04W 36/0016 |
| 2017/0317894 A1* | 11/2017 | Dao | H04L 41/5009 |
| 2018/0098251 A1* | 4/2018 | Li | H04W 36/0016 |
| 2018/0192471 A1* | 7/2018 | Li | H04W 72/53 |
| 2018/0295497 A1* | 10/2018 | Kim | H04W 8/08 |
| 2019/0007992 A1* | 1/2019 | Kim | H04W 76/27 |
| 2019/0029065 A1* | 1/2019 | Park | H04W 60/00 |
| 2019/0037448 A1* | 1/2019 | Shan | H04W 60/04 |
| 2019/0053104 A1* | 2/2019 | Qiao | H04W 28/24 |
| 2019/0090107 A1 | 3/2019 | Kim et al. | |
| 2019/0109823 A1* | 4/2019 | Qiao | H04L 47/24 |
| 2019/0116520 A1* | 4/2019 | Chaponniere | H04W 28/0268 |
| 2019/0116521 A1* | 4/2019 | Qiao | H04W 28/06 |
| 2019/0141606 A1* | 5/2019 | Qiao | H04W 76/18 |
| 2019/0159227 A1* | 5/2019 | Talebi Fard | H04W 36/0011 |
| 2019/0174449 A1* | 6/2019 | Shan | H04W 60/04 |
| 2019/0182897 A1* | 6/2019 | Jain | H04W 4/80 |
| 2019/0215724 A1* | 7/2019 | Talebi Fard | H04W 48/16 |
| 2019/0215731 A1* | 7/2019 | Qiao | H04W 24/06 |
| 2019/0230556 A1* | 7/2019 | Lee | H04W 28/16 |
| 2019/0261260 A1* | 8/2019 | Dao | H04W 48/00 |
| 2019/0268835 A1* | 8/2019 | Shan | H04W 48/16 |
| 2019/0297121 A1* | 9/2019 | Qiao | H04L 65/1016 |
| 2020/0092424 A1* | 3/2020 | Qiao | H04L 12/1407 |
| 2020/0196130 A1* | 6/2020 | Tamura | H04W 8/02 |
| 2020/0245110 A1 | 7/2020 | Kim et al. | |
| 2021/0266992 A1* | 8/2021 | Kim | H04M 15/49 |

FOREIGN PATENT DOCUMENTS

| | | | | |
|---|---|---|---|---|
| WO | WO-2019240483 A1 * | 12/2019 | | H04M 15/49 |
| WO | WO-2021026680 A1 * | 2/2021 | | H04M 15/41 |
| WO | WO-2021045859 A1 * | 3/2021 | | H04L 12/14 |

OTHER PUBLICATIONS

NEC, Solution for Key Issue #7: Charging for PC5 Direct Communication, 3GPP TSG SA WG2 #136, S2-1911242, Nov. 8, 2019.

Indian Office Action for IN Application No. 202217023592 mailed on Aug. 25, 2022.

Secretary of SA WG2: "Report of SA WG2 meetings #119", 3GPP Draft; Approved_Report_V1OO_SA2_119, 3rd Generation Partnership Project (3GPP), Mobile Competence Centre; 650, Route Des Lucioles; F-06921 Sophia-Antipolis Cedex; France vol. SA WG2, No. Dubrovnik, Croatia; Feb. 13, 2017 -Feb. 17, 2017 12.

Japanese Office Action for JP Application No. 2022-505500, mailed on Nov. 29, 2022 with English Translation.

China Mobile, Nokia, Ericsson, Huawei, "Summary for WI 5G System—Phase 1"[online], 3GPP TSG CT/SA Meeting #80, La Jolla, CA, USA, Jun. 13-15, 2018, CP-181167/SP-180520.

International Search Report for PCT Application No. PCT/JP2020/036648, mailed on Nov. 26, 2020.

English translation of Written opinion for PCT Application No. PCT/JP2020/036648, mailed on Nov. 26, 2020.

3GPP TS 23.501 V16.1.0, "System Architecture for the 5G System", Jun. 2019,pp. 1-367.

3GPP TS 23.502 V16.1.0, "Procedures for the 5G System", Jun. 2019, pp. 1-499.

3GPP TS 23.503 V16.1.0. "Policy and Charging Control Framework for the 5G System", Jun. 2019, pp. 1-98.

3GPP TS 23.303 V15.1.0, "Proximity-based services (ProSe)$^x$,", Jun. 2018, pp. 1-130.

3GPP TS 32.277 V15.1.0, "Proximity-based Services (ProSe) charging", Jun. 2018, pp. 1-118.

Secretary of SA WG2: "Report of SA WG2 meetings #119", 3GPP Draft: vol. SA WG2, No. Dubrovnik, Croatia; (May 12, 2017) XP051289069. pp. 1-313.

3GPP TS 32.277 version 14.2.0 Release 14, pp. 1-118.

Murkaz Ahmed et al: "An Intra-inter-cell device-to-device communication scheme to enhance 5G network throughput with delay modeling", vol. 69, No. 4, (Mar. 28, 2018), pp. 461-475, XP036619085.

3GPP TS 29.513 version 15.3.0 Release 15, pp. 1-89.

JP Official Communication for JP Application No. 2023-093587, mailed on Aug. 20, 2024 with English Translation.

OPPO, "Solution for charging", 3GPP TSG SA WG2 #136 S2-1911153, Nov. 8, 2019, pp. 1-6.

CN Office Action for CN Application No. 202080081892.6, mailed on Sep. 23, 2024 with English Translation.

Qualcomm Incorporated, Samsung, Nokia, Ericsson, "Clarification for V2X communication over PC5 in limited service state", 3GPP SS WG2 Meeting #S2-118bis S2-170186, Jan. 10, 2017.

* cited by examiner

CHARGING IN DEVICE-TO-DEVICE COMMUNICATIONS OVER PC5 FOR INTERACTIVE SERVICES

This application is a National Stage Entry of PCT/JP2020/036648 filed on Sep. 28, 2020, which claims priority from European Patent Application 19200645.0 filed on Sep. 30, 2019, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to interactive services involving device-to-device communications and associated charging in the so-called '5G' (or 'Next Generation') systems.

BACKGROUND ART

The 3GPP Working Groups are currently defining the 5G system and the 3GPP TSG SA WG2 (SA2) is specifying the system architecture and procedures for 5G system. Within SA2, Proximity-based service (ProSe) has been defined and documented in a technical specification (TS) 23.303 V15.1.0 [4].

Recently, new study has been proposed in SA2 to investigate how to enhance proximity based services in 5GS.

SUMMARY OF INVENTION

In current 5G system, the UPF is responsible for user traffic measurement for charging based on an instruction by the PCF. The SMF is responsible for enforcing the UPF for charging and also responsible for traffic usage reporting. However, as D2D direct communication over the PC5 in 5GS is between UEs, there is no way for the SMF/UPF to measure and report the traffic usage on PC5.

Therefore, there is a need to define a new charging solution for D2D direct communication on PC5 in 5GS.

According to an aspect of the present disclosure, user equipment, UE, includes: means for generating a usage information report on PC5 interface in a case where a reporting criteria is met; and means for transmitting, to a Network Function node in a core network, a non access stratum, NAS, message including the usage information report.

According to another aspect of the present disclosure, a Network Function, NF, node in a core network node, includes: means for receiving, from User Equipment, UE, a non access stratum, NAS, message including a usage information report for PC5 interface on the UE; and means for sending, to a charging function node in the core network node, the usage information report.

According to another aspect of the present disclosure, a policy control function node in a core network, includes: means for receiving, from an application function node, a charging policy for PC5 interface on user equipment, UE, includes at least one of: a charging key, a service identifier, an application service provider identifier, a charging method, a measurement method, application function record information, service identifier level reporting, and a reference interface ID for the PC5 interface; and means for sending a reporting rule to the UE via a Network Function node in the core network, based on the charging policy, wherein usage information report sending from the UE to a charging function node is triggered by the reporting rule.

According to another aspect of the present disclosure, an Application function node, includes: means for sending a subscribe message, to at least one of a session management function node and a policy control node, for subscribing a charging service; and means for sending a charging policy for PC5 interface on the UE includes at least one of: a charging key, a service identifier, an application service provider identifier, a charging method, a measurement method, application function record information, service identifier level reporting, and a reference interface ID for the PC5 interface.

According to another aspect of the present disclosure, a reporting method for user equipment, UE, the reporting method includes: generating a usage information report on PC5 interface in a case where a reporting criteria is met; and transmitting, to a Network Function node in a core network, a non access stratum, NAS, message including the usage information report.

According to another aspect of the present disclosure, a reporting method for a Network Function, NF, node in a core network node, the reporting method includes: receiving, from User Equipment, UE, a non access stratum, NAS, message including a usage information report for PC5 interface on the UE; and sending, to a charging function node in the core network node, the usage information report.

According to another aspect of the present disclosure, a controlling method for a policy control function node in a core network, the controlling method includes: receiving, from an application function node, a charging policy for PC5 interface on user equipment, UE, includes at least one of: a charging key, a service identifier, an application service provider identifier, a charging method, a measurement method, application function record information, service identifier level reporting, and a reference interface ID for the PC5 interface; and sending a reporting rule to the UE via a Network Function node in the core network, based on the charging policy, wherein usage information report sending from the UE to a charging function node is triggered by the reporting rule.

According to another aspect of the present disclosure, a controlling method for an Application function node, the method includes: sending a subscribe message, to at least one of a session management function node and a policy control node, for subscribing a charging service; and sending a charging policy for PC5 interface on the UE includes at least one of: a charging key, a service identifier, an application service provider identifier, a charging method, a measurement method, application function record information, service identifier level reporting, and a reference interface ID for the PC5 interface.

DESCRIPTION OF EMBODIMENTS

In order to address the aforementioned problems, the inventors propose the following solutions:
Solution 1 Charging reporting for traffic over PC5
Solution 2 Charging reporting for traffic over PC5 based on SBA-AF contributes to PC5 charging policy
Solution 3 Charging reporting for traffic over PC5 with pre-configured usage information collection and reporting
Solution 4 UE reporting triggered by AF
Solution 5 UE reporting triggered by UE's application layer
Solution 6 UE reporting charging on PC5 via SMF
Modifications on PCC Rules The following contents are proposed to add to the current PCC rules as specified in 3GPP TS 23.503 [3]:
Charging for PC5: This attribute in PCC rules includes a charging key, a service identifier, an application service provider identifier, a charging method, a measurement method, application function record information, service identifier level reporting, a reference interface ID (i.e. PC5) and other kinds of relevant charging parameters.
Usage Monitoring and Reporting for PC5: This attribute in PCC rules includes parameters having an application layer group ID, a Layer 2 group ID, a UE application ID, an Application ID, an Application server ID, usage report on PC5 or other kinds of relevant usage parameters. Usage report on PC5 includes a list of amount of data transmitted and received with timestamp, a source ID, a destination ID and the UE location. Trigger condition and threshold are also included.

Solution 1 Charging Reporting for Traffic Over PC5
Example Aspect 1-1: UE Reporting Usage Report to CHF Via PCF when the Criteria is Met The main idea of this solution is that the PCF 12 defines rules and policies for the UE 3 to collect and report its usage information on both Uu and PC5. In this Example Aspect, the UE 3 reports usage information to the CHF 13 via the PCF 12. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Figure 1:
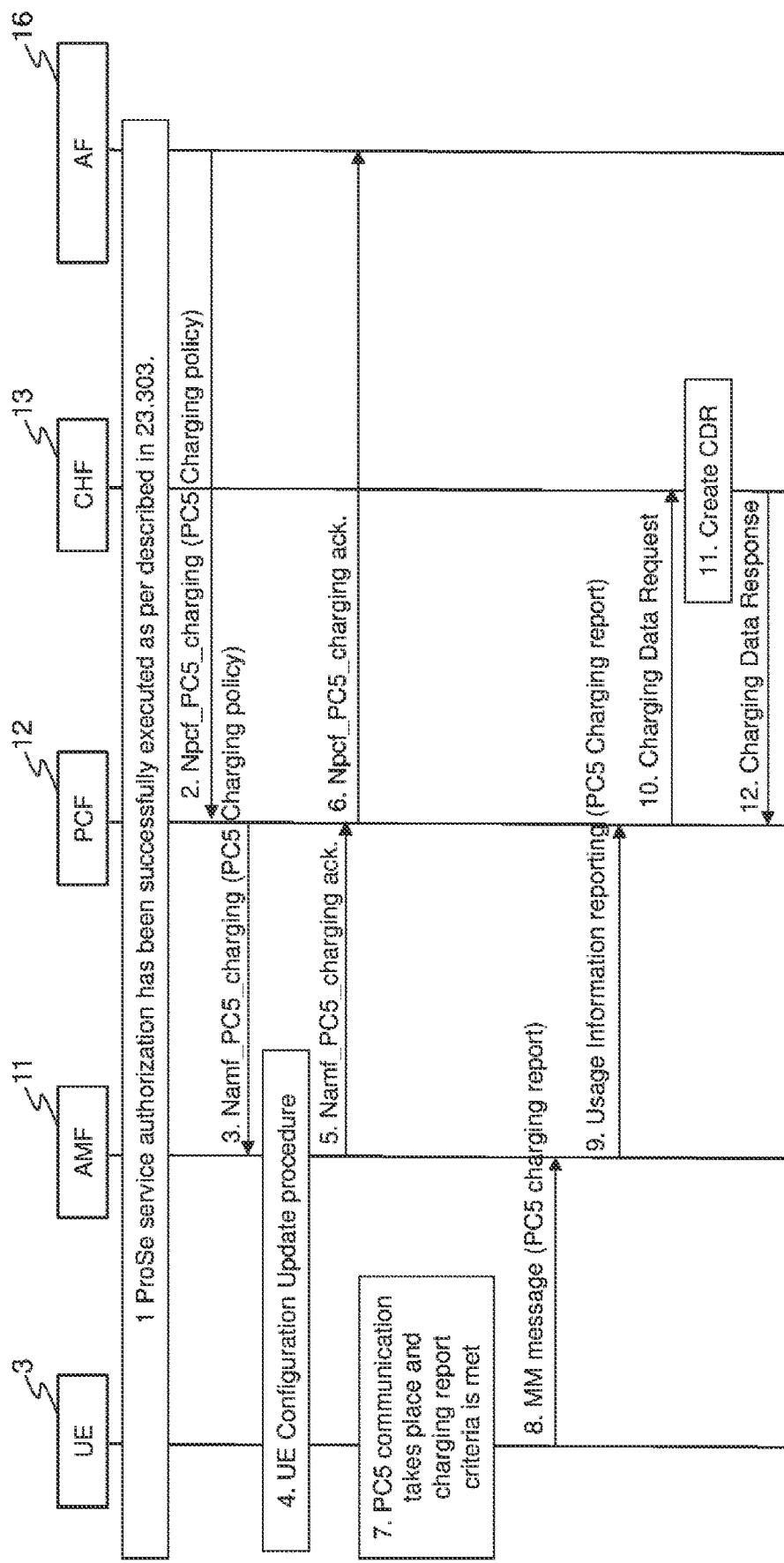
FIG. 1 illustrates schematically an exemplary procedure for charging reporting for traffic over PC5 via PCF 12.

FIG. 1 illustrates schematically an exemplary procedure for charging reporting for traffic over PC5 via the PCF 12.

Step 1: When the UE 3 initiates a ProSe service, ProSe service authorization takes place. In this step, the ProSe service authorization has been successfully executed as per described in 3GPP TS 23.303 [4]. Although in the present example a ProSe Function is used, it will be appreciated that the functionalities of the ProSe Function may be provided by the PCF 12 (or another node responsible for proximity services).

Step 2: The AF 16 invokes a PC5 charging enforcement procedure or any other procedure or sends, to the PCF 12, a Npcf_PC5_charging message to inform the PCF 12 of a PC5 Charging policy. The PC5 charging policy includes a charging key, a service identifier, an application service provider identifier, a charging method, a measurement method, application function record information, service identifier level reporting, and a reference interface Indicator (i.e. PC5), usage reporting criteria and other kinds of relevant usage parameters.

Step 3: The PCF 12 invokes a PC5 charging enforcement procedure or any other procedure or sends, to the AMF 11, a Namf_PC5_charging message to inform the AMF 11 of the PC5 Charging policy. The PCF 12 may add a usage information collection and reporting in PCC rules. The usage information collection and reporting includes a usage information reporting criteria and usage information measurement, which has an Application Layer Group ID, a Layer 2 group ID, a UE application ID, an Application ID, an Application Server ID, a "Usage Report on PC5" Indicator, a "Usage Report on Uu" indicator, and other kinds of relevant usage parameters.

Step 4: The AMF 11 delivers the PC5 Charging policy and PCC rules to the UE 3 using the UE Configuration Update procedure.

Step 5: The AMF 11 sends the Namf_PC5_charging acknowledge message to the PCF 12.

Step 6: The PCF 12 sends the Npcf_PC5_charging acknowledge message to the AF 16.

Step 7: PC5 communication takes place. The UE 3 creates a usage information report when the reporting criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Step 8: The UE 3 invokes the usage reporting procedure or any other service procedure or sends an MM message with PC5 charging report Information to the AMF 11. This report includes an Application Layer Group ID, an Application ID, a Layer 2 Group ID, a UE Application ID, an Application Server ID, Usage Report on PC5, Usage Report on Uu, and other kinds of relevant usage parameters. The usage report on PC5 includes a list of amount of data transmitted and received via PC5 with timestamp, a source ID, a destination ID and the UE location. The usage report on Uu includes a list of amount of data transmitted and received via Uu with timestamp, a source ID, a destination ID and the UE location.

Step 9: The AMF 11 sends the Usage information reporting to the PCF 12 with the PC5 charging report Information.

Step 10: The PCF 12 sends the Charging Data Request message to the CHF 13 with the PC5 charging report Information.

Step 11: The CHF 13 generates a CDR based on the PC5 charging report Information received in step 10.

Step 12: The CHF 13 sends the Charging Data Response message to the PCF 12.

Example Aspect 1-2: UE Reporting Usage Report to CHF Via AMF when the Criteria is Met The main idea of this solution is that the PCF 12 defines rules and policies for the UE 3 to collect and report its usage information on both Uu and PC5. In this Example Aspect, UE reporting to the CHF 13 is performed via the AMF 11 when the criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Figure 2:
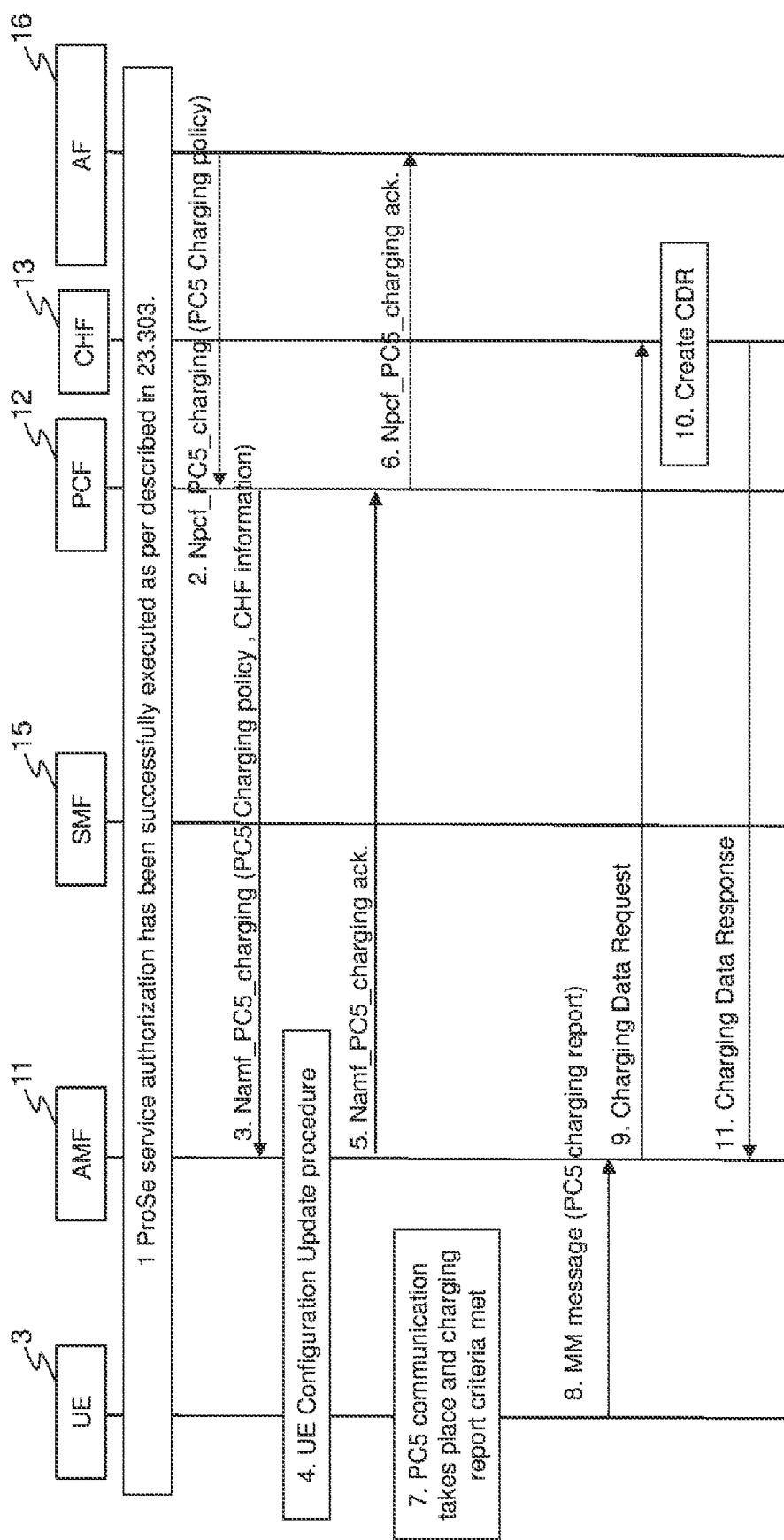
FIG. 2 illustrates schematically an exemplary procedure for charging reporting traffic over PC5 via AMF 11.

FIG. 2 illustrates schematically an exemplary procedure for charging reporting traffic over PC5 via the AMF 11.

Step 1: When the UE 3 initiates a ProSe service, ProSe service authorization takes place. In this step, the ProSe service authorization has been successfully executed as per described in 3GPP TS 23.303 [4]. Although in the present example a ProSe Function is used, it will be appreciated that the functionalities of the ProSe Function may be provided by the PCF 12 (or another node responsible for proximity services).

Step 2: The AF 16 invokes a PC5 charging enforcement procedure or any other procedure or sends, to the PCF 12, a Npcf_PC5_charging message to inform the PCF 12 of a PC5 Charging policy. The PC5 charging policy includes a charging key, a service identifier, an application service provider identifier, a charging method, a measurement method, application function record information, a service identifier level reporting, and a reference interface Indicator (i.e. PC5), a usage reporting criteria and other kinds of relevant usage parameters.

Step 3: The PCF 12 invokes a PC5 charging enforcement procedure or any other procedure or sends, to the AMF 11, a Namf_PC5_charging message to inform the AMF 11 of the PC5 Charging policy. The PCF 12 includes CHF related information, i.e., CHF address information, in this message so that the AMF 11 can report the usage information to the CHF 13. The PCF 12 may add a usage information collection and reporting in PCC rules. The usage information collection and reporting includes usage information reporting criteria and usage information measurement, which has an Application Layer Group ID, a Layer 2 group ID, a UE application ID, an Application ID, an Application Server ID, a "Usage Report on PC5" Indicator, a "Usage Report on Uu" indicator, and other kinds of relevant usage parameters.

Step 4: The AMF 11 delivers the PC5 Charging policy and PCC rules to the UE 3 using the UE Configuration Update procedure.

Step 5: The AMF 11 sends the Namf_PC5_charging acknowledge message to the PCF 12.

Step 6: The PCF 12 sends the Npcf_PC5_charging acknowledge message to the AF 16.

Step 7: PC5 communication takes place. The UE 3 creates usage information report when the reporting criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Step 8: The UE 3 invokes the usage reporting procedure or any other service procedure or sends an MM message with PC5 charging report Information to the AMF 11. This report includes an Application Layer Group ID, an Application ID, a Layer 2 Group ID, a UE Application ID, an Application Server ID, Usage Report on PC5, Usage Report on Uu, and other kinds of relevant usage parameters. The usage report on PC5 includes a list of amount of data transmitted and received via PC5 with timestamp, a source ID, a destination ID and the UE location. The usage report on Uu includes a list of amount of data transmitted and received via Uu with timestamp, a source ID, a destination ID and the UE location.

Step 9: The AMF 11 sends the Charging Data Request message to the CHF 13 with the PC5 charging report Information.

Step 10: The CHF 13 generates a CDR based on the PC5 charging report Information received in step 9.

Step 11: The CHF 13 sends the Charging Data Response message to the AMF 11.

Solution 2 Charging Reporting for Traffic Over PC5 Based on SBA-AF Contributes to PC5 Charging Policy Example Aspect 2-1: AF Contributes to PC5 Charging Policy The main idea of this solution is that the AF 16 contributes to PC5 charging policy, and the PCF 12 delivers the charging policies to the UE via the AMF 11/SMF 15. the UE 3 reports the SMF 15 its usage when the report criteria is met, and the SMF 15 notifies the CHF 13 of the usage report.

Figure 3:
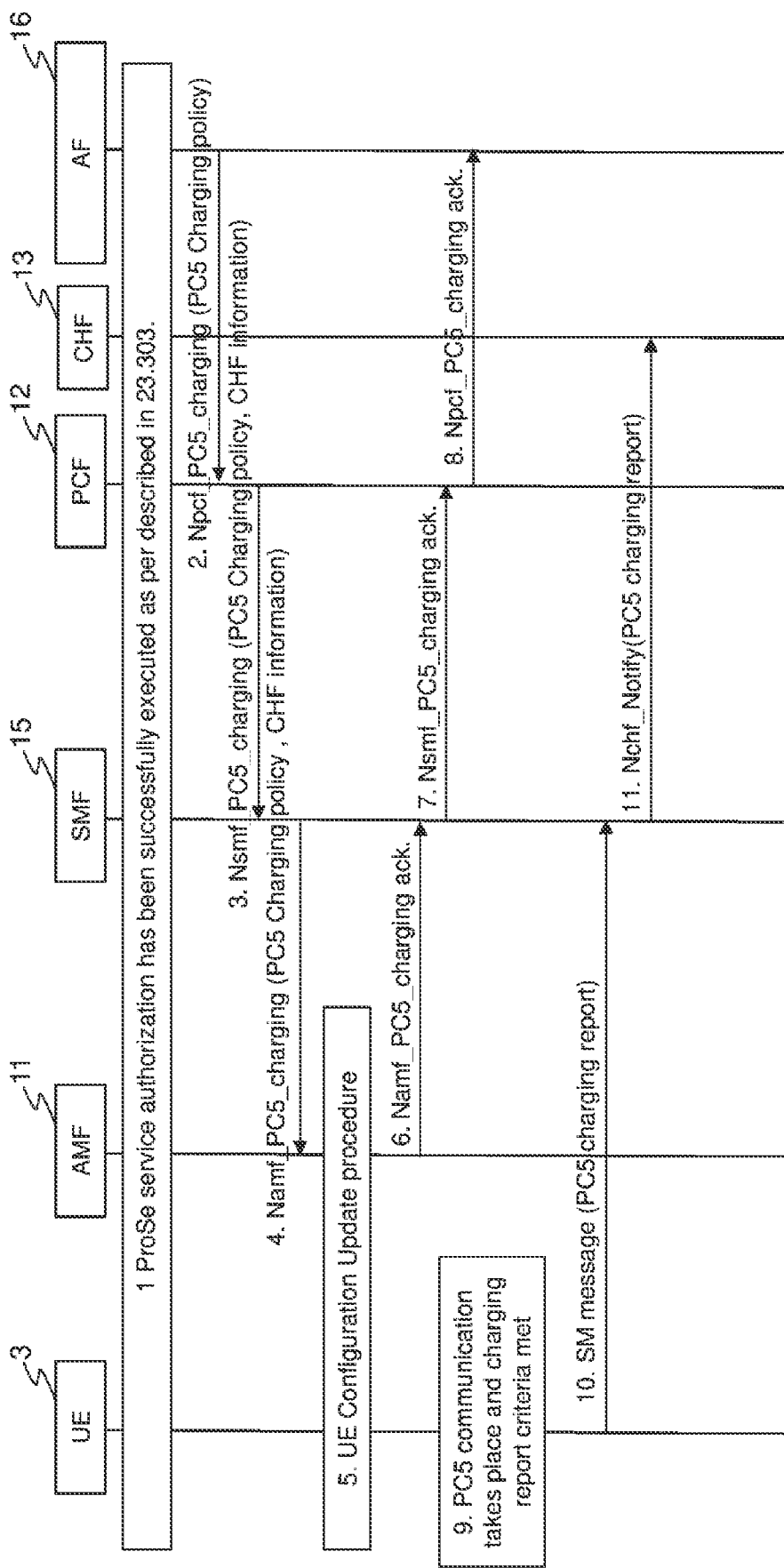
FIG. 3 illustrates schematically an exemplary procedure for Charging over PC5 for traffic based on SBA, in which AF 16 contributes to PC5 charging policy.

FIG. 3 illustrates schematically an exemplary procedure for Charging over PC5 for traffic (such as Interactive Services) based on SBA, in which the AF 16 contributes to PC5 charging policy.

Step 1: When the UE 3 initiates ProSe service, ProSe service authorization takes place. In this step, the ProSe service authorization has been successfully executed as per described in 3GPP TS 23.303 [4]. Although in the present example a ProSe Function is used, it will be appreciated that the functionalities of the ProSe Function may be provided by the PCF 12 (or another node responsible for proximity services).

Step 2: The AF 16 invokes a PC5 charging enforcement procedure or any other procedure or sends, to the PCF 12, a Npcf_PC5_charging message to inform the PCF 12 of a PC5 Charging policy. The PC5 charging policy includes a charging key, a service identifier, an application service provider identifier, a charging method, a measurement method, application function record information, service identifier level reporting, and a reference interface Indicator (i.e. PC5), usage reporting criteria and other kinds of relevant usage parameters.

Step 3: The PCF 12 invokes a PC5 charging enforcement procedure or any other procedure or sends, to the SMF 15, a Nsmf_PC5_charging message to inform the SMF 15 of the PC5 Charging policy. The PCF 12 includes CHF related information, i.e. CHF address information in this message so that the AMF 11 can report the usage information to the CHF 13. The PCF 12 may add a usage information collection and reporting in PCC rules. The usage information collection and reporting includes a usage information reporting criteria and usage information measurement, which has an Application Layer Group ID, a Layer 2 group ID, a UE application ID, an Application ID, an Application Server ID, a "Usage Report on PC5" Indicator, a "Usage Report on Uu" indicator, and other kinds of relevant usage parameters.

Step 4: The SMF 15 invokes a PC5 charging enforcement procedure or any other procedure or sends, to the AMF 11, a Namf_PC5_charging message to inform the AMF 11 of the PC5 Charging policy and PCC rules.

Step 5: The AMF 11 delivers the PC5 Charging policy and PCC rules to the UE 3 using the UE Configuration Update procedure.

Step 6: The AMF 11 sends the Namf_PC5_charging acknowledge message to the SMF 15.

Step 7: The SMF 15 sends the Nsmf_PC5_charging acknowledge message to the PCF 12.

Step 8: The PCF 12 sends the Npcf_PC5_charging acknowledge message to the AF 16.

Step 9: PC5 communication takes place. The UE 3 creates usage information report when the reporting criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Step 10: The UE 3 invokes the usage reporting procedure or any other service procedure or sends an SM message with PC5 charging report Information to the SMF 15 via the AMF 11. This report includes an Application Layer Group ID, an Application ID, a Layer 2 Group ID, a UE Application ID, an Application Server ID, Usage Report on PC5, Usage Report on Uu, and other kinds of relevant usage parameters. The usage report on PC5 includes a list of amount of data transmitted and received via PC5 with timestamp, a source ID, a destination ID and the UE location. The usage report on Uu includes a list of amount of data transmitted and received via Uu with timestamp, a source ID, a destination ID and the UE location.

Step 11: The SMF 15 sends the Nchf_Notify message to the CHF 13 with PC5 charging report Information. The SMF 15 then generates a CDR based on the PC5 charging report Information received in this step.

Solution 3 Charging Reporting for Traffic Over PC5 with Pre-Configured Usage Information Collection and Reporting Example Aspect 3-1: UE Reporting Via PCF to CHF when the Criteria is Met The main idea of this solution is that the UE 3 is pre-configured to collect and report its usage information on both Uu and PC5. In this Example Aspect, the UE reporting to the CHF 13 is via the PCF 12 when the criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Figure 4:
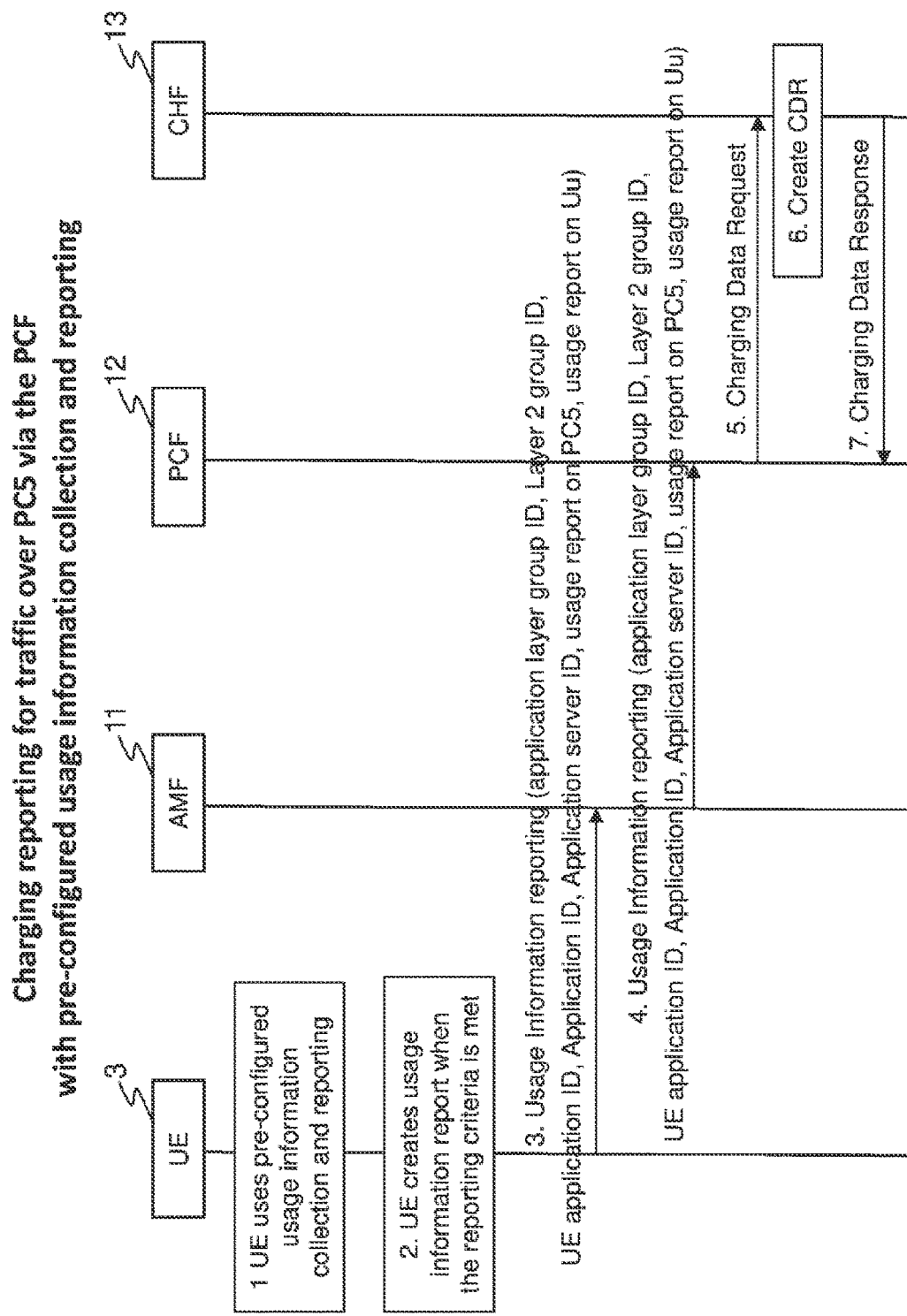
FIG. 4 illustrates schematically an exemplary procedure for Charging reporting for traffic over PC5 via the PCF 12.

FIG. 4 illustrates schematically an exemplary procedure for Charging reporting for traffic over PC5 via the PCF 12 (with pre-configured rules on usage information collection and reporting).

Step 1: The UE 3 uses pre-configured usage information collection and reporting policies.

Step 2: The UE 3 creates a usage information report when the reporting criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Step 3-4: The UE 3 invokes the usage reporting procedure or any other service procedure or sends, to the PCF 12, a Usage Information Reporting Message via the AMF 11 to report, to the network, a UE's usage information report. The usage information report has an Application Layer Group ID, an Application ID, a Layer 2 Group ID, a UE Application ID, an Application Server ID, a Usage Report on PC5, a Usage Report on Uu, and other kinds of relevant usage parameters. The usage report on PC5 includes a list of amount of data transmitted and received via PC5 with a timestamp, a source ID, a destination ID and the UE location. The usage report on Uu includes a list of amount of data transmitted and received via Uu with timestamp, a source ID, a destination ID and the UE location.

Step 5-7: The PCF 12 contacts the CHF 13 to create a CDR. The CHF 13 can cross-check the usage information report from different UEs.

Example Aspect 3-2: UE Reporting Via AMF to CHF when the Criteria is Met

The main idea of this solution is that the UE 3 is pre-configured to collect and report its usage information on both Uu and PC5. In this Example Aspect, the UE reporting to the CHF 13 is via the AMF 11 when the criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Figure 5:
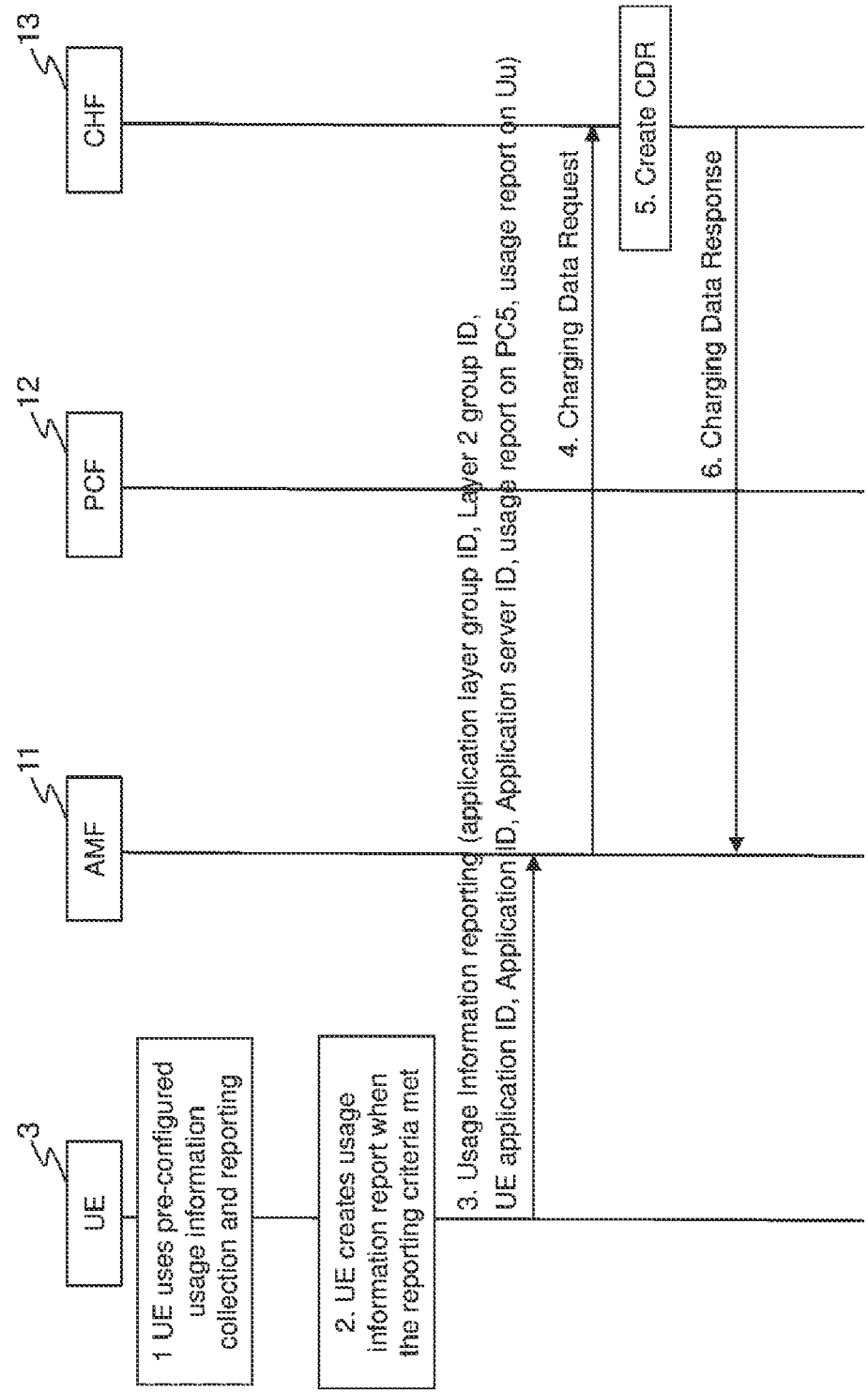
FIG. 5 illustrates schematically an exemplary procedure for charging reporting for traffic over PC5 via the AMF 11.

FIG. 5 illustrates schematically an exemplary procedure for charging reporting for traffic over PC5 via the AMF 11 (with pre-configured rules on usage information collection and reporting).

Step 1: The UE 3 uses pre-configured usage information collection and reporting policies.

Step 2: The UE 3 creates a usage information report when the reporting criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Step 3: The UE 3 invokes the usage reporting procedure or any other service procedure or sends, to the AMF 11, a Usage Information Reporting Message to report, to the network, a UE's usage information report. The usage information report has an Application Layer Group ID, an Application ID, a Layer 2 Group ID, a UE Application ID, an Application Server ID, a Usage Report on PC5, a Usage Report on Uu, and other kinds of relevant usage parameters. The usage report on PC5 includes a list of amount of data transmitted and received via PC5 with timestamp, a source ID, a destination ID and the UE location. The usage report on Uu includes a list of amount of data transmitted and received via Uu with timestamp, a source ID, a destination ID and the UE location.

Step 4-6: The AMF 11 contacts the CHF 13 to create a CDR. The CHF 13 can cross-check the usage information report from different UEs.

In this solution, the UE 3 uses pre-configured charging policies. As its result, it allows the network to charge UE's usage accurately and flexibly.

Solution 4 UE Reporting Triggered by AF

Example Aspect 4-1: UE Reporting Triggered by AF's Charging Request Message

The main idea of this Example Aspect is that the AF 16 requests the network to provide charging report, and the network triggers the UE 3 to report its usage.

Figure 6:
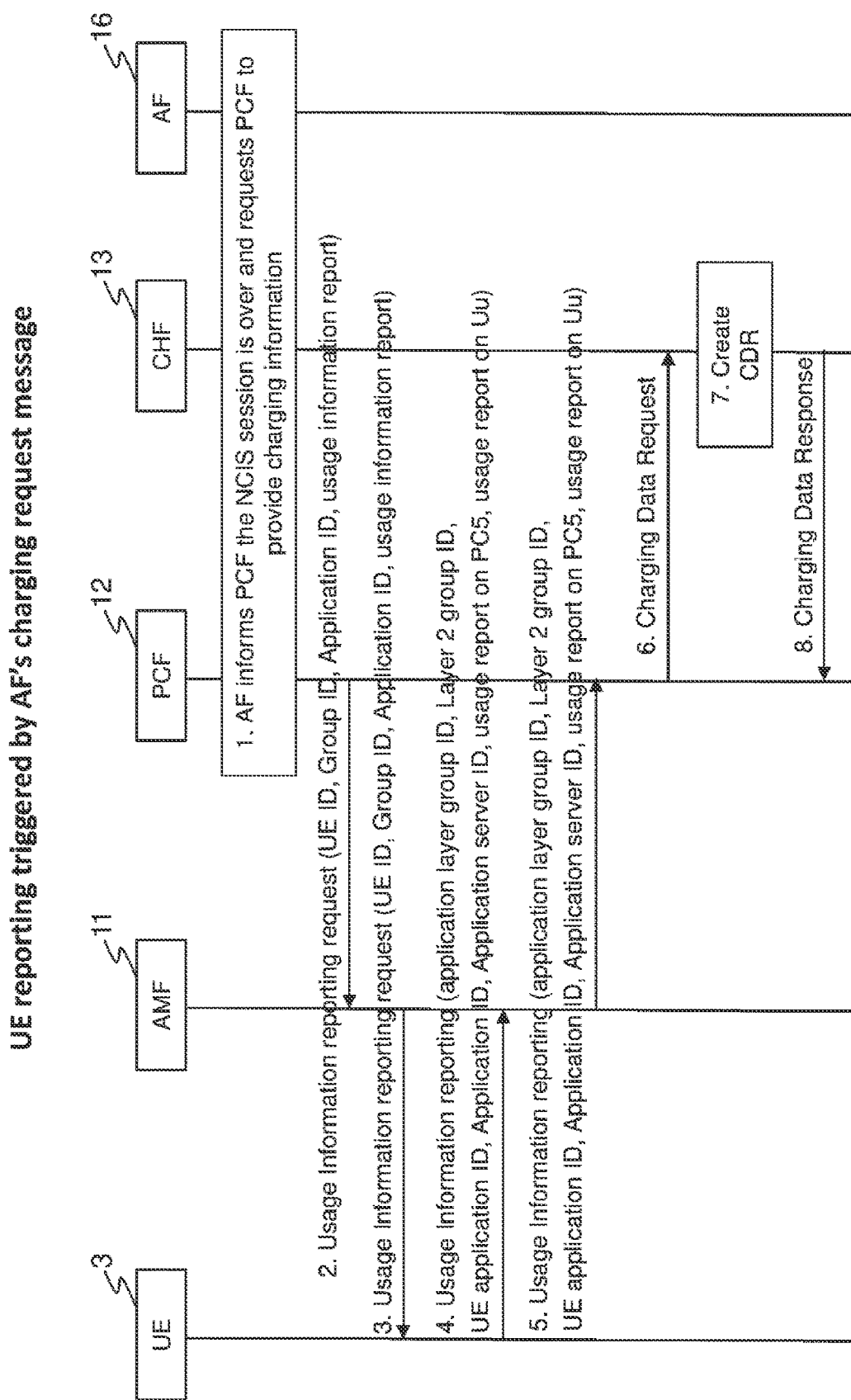
FIG. 6 illustrates schematically an exemplary procedure for UE reporting triggered by an AF's charging request message.

FIG. 6 illustrates schematically an exemplary procedure for UE reporting triggered by an AF's charging request message.

Step 1: When the NCIS session finishes, the AF 16 invokes the charging reporting procedure or any other service procedure or sends, to the PCF 12, a charging reporting request message to inform the PCF 12 that the NCIS session is over and request the network to provide the charging information.

Step 2-3: The PCF 12 sends the UE Usage Information reporting request. This message may include a UE ID, a Group ID, an Application ID, a usage information report indication and other kinds of relevant usage parameters.

Step 4-5: The UE 3 invokes the usage reporting procedure or any other service procedure or sends, to the PCF 12, a Usage Information Reporting Message via the AMF 11 to report, to the network, a UE's usage information report. The usage information report has an Application Layer Group ID, an Application ID, a Layer 2 Group ID, a UE Application ID, an Application Server ID, a Usage Report on PC5, a Usage Report on Uu, and other kinds of relevant usage parameters. The usage report on PC5 includes a list of amount of data transmitted and received via PC5 with timestamp, a source ID, a destination ID and the UE location. The usage report on Uu includes a list of amount of data transmitted and received via Uu with timestamp, a source ID, a destination ID and the UE location.

Step 6-8: The PCF 12 contacts the CHF 13 to create a CDR

In this example aspect, the AF 16 requests the network to provide charging report. As its result, it allows the network to charge UE's usage accurately and flexibly.

Example Aspect 4-2: Enforce CDR Generation after UE has been Authorized for ProSe Service The main idea of this solution is that the ProSe application Server 16 issues a Subscribe message to the SMF 15/PCF 12 when UE 3 has been authorized by the server. The SMF 15 behaves as a Producer Proxy. Once the Subscribe message is received by the SMF 15/PCF 12, the SMF 15/PCF 12 performs the UE configuration Update procedure so that UE 3 can get the Charging policy.

Figure 7:
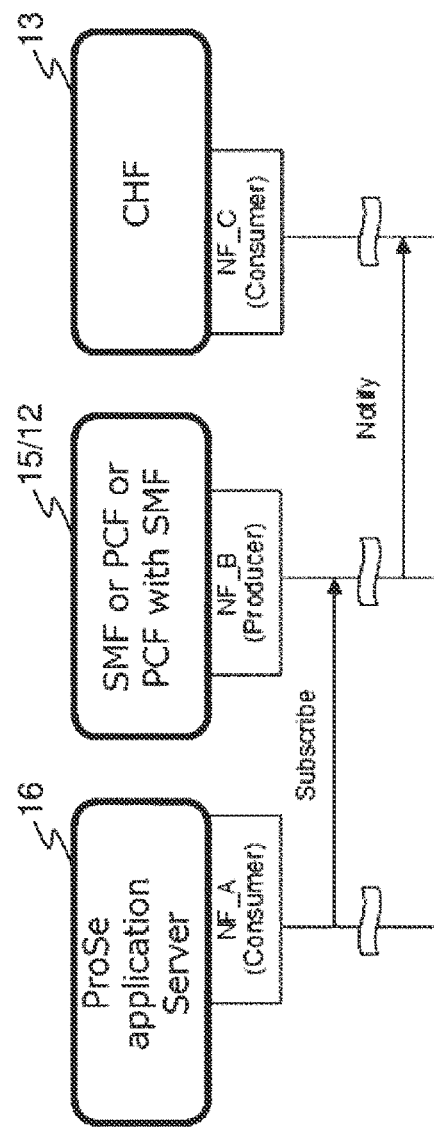
FIG. 7 is a high level illustration of charging over PC5 based on SBA.

FIG. 7 is a high level illustration of charging over PC5 based on SBA.

Figure 8:
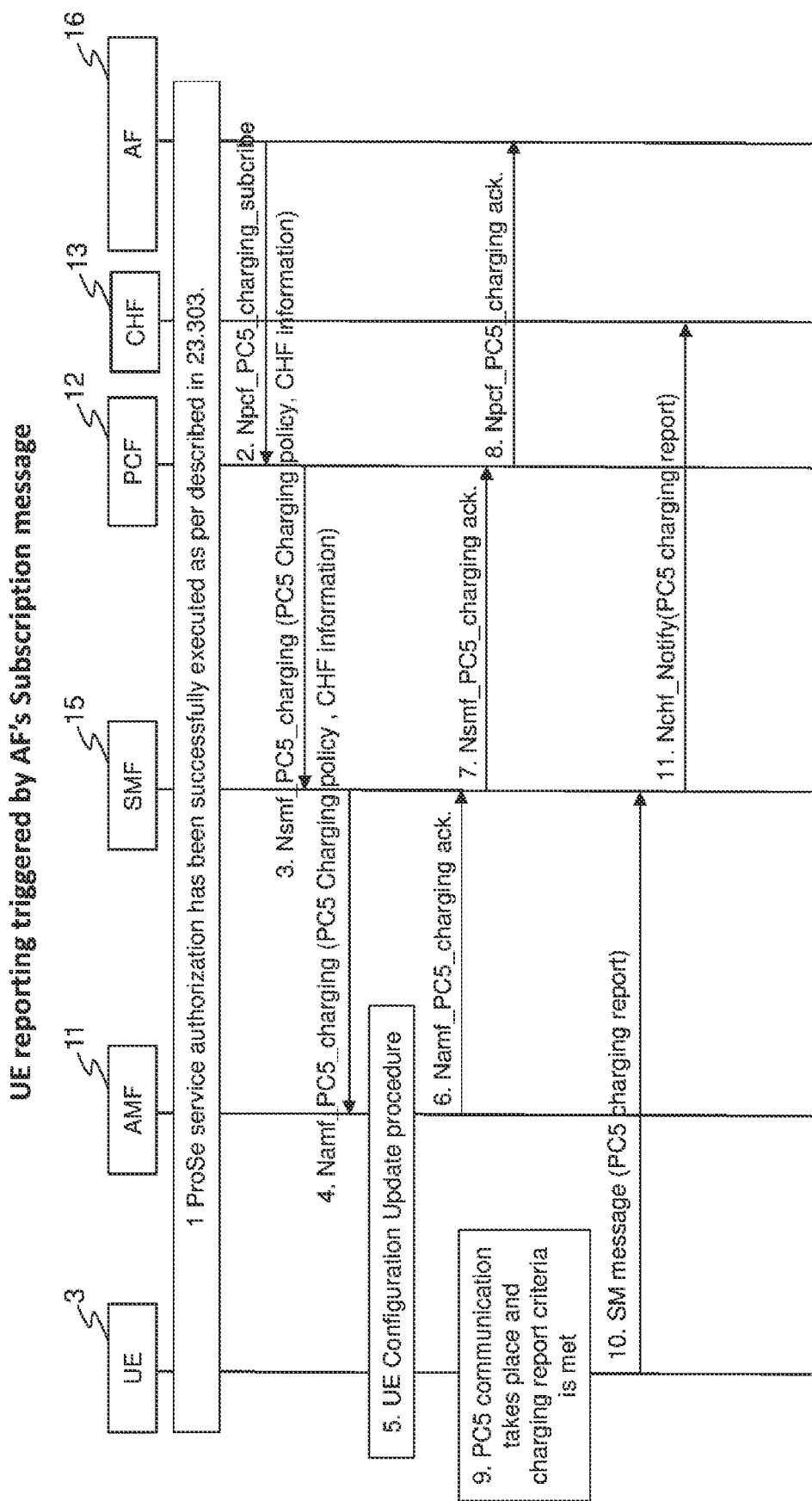
FIG. 8 illustrates schematically an exemplary procedure for UE reporting triggered by AF's Subscription message.

FIG. 8 illustrates schematically an exemplary procedure for UE reporting triggered by AF's Subscription message.

Step 1: The ProSe service authorization has been successfully executed as per described in 3GPP TS 23.303. Although in the present example a ProSe Function is used, it will be appreciated that the functionalities of the ProSe Function may be provided by the PCF 12 (or another node responsible for proximity services).

Step 2: The AF 16 invokes a PC5 charging services procedure or any other procedure or sends, to the PCF 12, a Npcf_PC5_0 message to subscribe the network's PC5 Charging service.

Step 3-5: The PCF 12 delivers its policies, which includes the PC5 charging policy, and CHF related information to UE 3. The CHF related information is the CHF ID that needs to receive the usage information report. If the UE 3 is in CM-CONNECTED, UE policy delivery with new PCC rules with usage information collection and reporting is in the UE Policy container. The AMF 11 transfers transparently the UE Policy container received from the PCF 12 to the UE 3. The usage information collection and reporting includes usage information reporting criteria and usage information measurement, which has an Application Layer Group ID, a Layer 2 group ID, a UE application ID, an Application ID, an Application Server ID, a Usage Report on PC5 Indicator, a Usage Report on Uu indicator, and other kinds of relevant usage parameters.

Step 6-8: The AMF 11 acknowledges the UE policies by sending the message Namf_PC5_charging acknowledgement to the network, which is transferred to the AF 16 via the SMF 15/PCF 12.

Step 9: Direct communication takes place over PC5, and the UE 3 creates a usage information report when the reporting criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Step 10: The UE 3 invokes the usage reporting procedure or any other service procedure or sends, to the SMF 15, a SM message with PC5 charging report Information to report, to the network, a UE's usage information report. The usage information report has an Application Layer Group ID, an Application ID, a Layer 2 Group ID, a UE Application ID, an Application Server ID, a Usage Report on PC5, a Usage Report on Uu, and other kinds of relevant usage parameters. The usage report on PC5 includes a list of amount of data transmitted and received via PC5 with timestamp, a source ID, a destination ID and the UE location. The usage report on Uu includes a list of amount of data transmitted and received via Uu with timestamp, a source ID, a destination ID and the UE location.

Step 11: The SMF 15 notifies the CHF 13 to create a CDR. The CHF 13 can cross-check the usage information report from different UEs.

In this example aspect, the AF 16 subscribe the PCF's service on charging report, and the PCF 12 provides the CHF 13 the reports. As its result, it allows the network to charge UE's usage accurately and flexibly.

Solution 5 UE Reporting Triggered by UE's Application Layer

Example Aspect 5-1: UE Reporting Via PCF to CHF when the Criteria is Met

The main idea of this solution is that the UE application layer triggers the UE 3 to collect and report its usage information on both Uu and PC5. In this Example Aspect, the UE reporting to the CHF 13 is via the PCF 12 when the criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Figure 9:
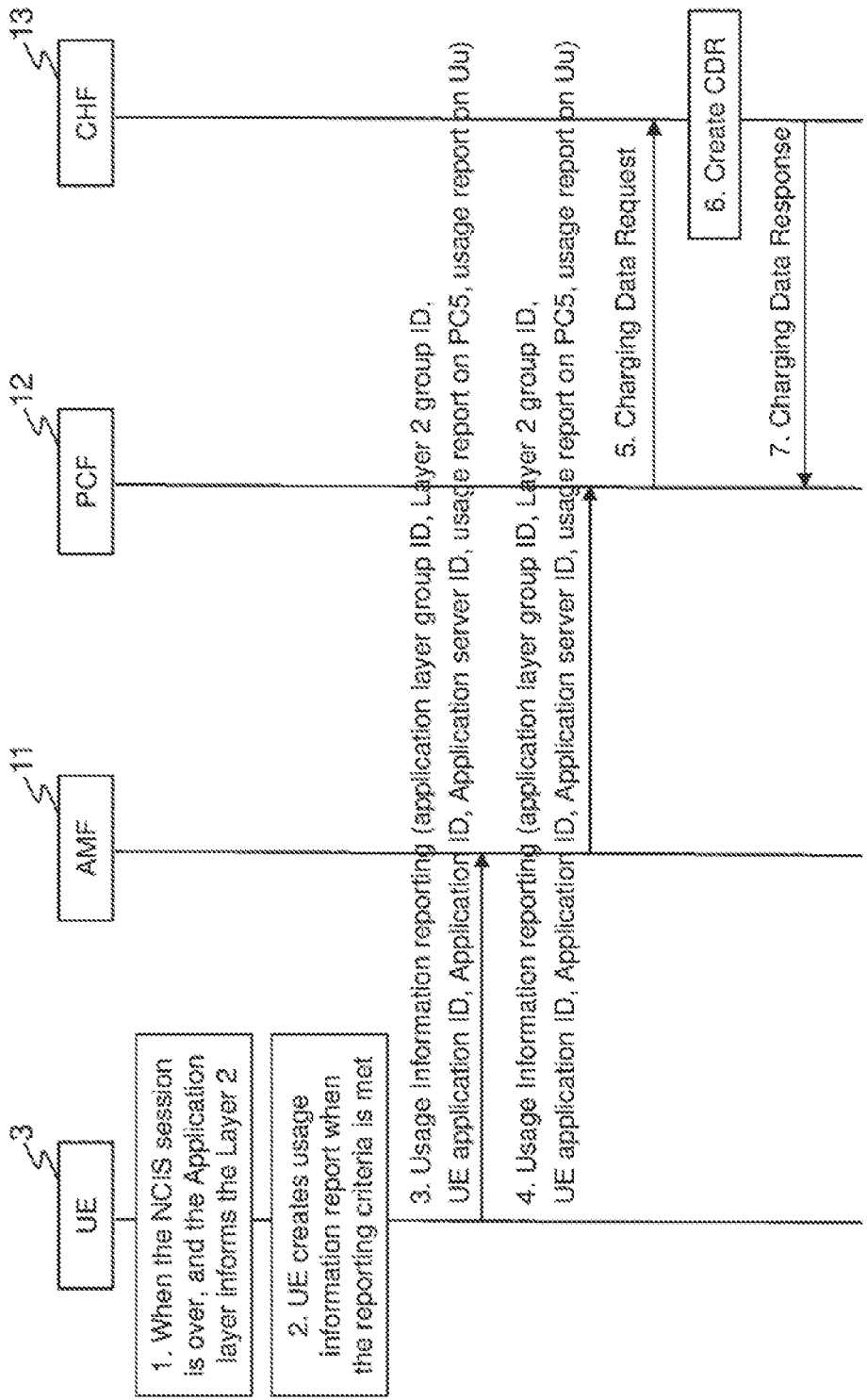
FIG. 9 illustrates schematically an exemplary procedure in which the UE's application layer triggers a UE 3 to collect and report its usage information on both Uu and PC5 via the PCF 12.

FIG. 9 illustrates schematically an exemplary procedure in which the UE's application layer triggers the UE 3 to collect and report its usage information on both Uu and PC5 via the PCF 12.

Step 1: UE's Application Layer informs its Layer 2 when the NCIS session is over.

Step 2: The UE 3 creates a usage information report when the reporting criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Step 3-4: The UE 3 invokes the usage reporting procedure or any other service procedure or sends, to the PCF 12, a Usage Information Reporting Message via the AMF 11 to report the network UE's usage information report. The usage information report has an Application Layer Group ID, an Application ID, a Layer 2 Group ID, a UE Application ID, an Application Server ID, a Usage Report on PC5, a Usage Report on Uu, and other kinds of relevant usage parameters. The usage report on PC5 includes a list of amount of data transmitted and received via PC5 with timestamp, a source ID, a destination ID and the UE location. The usage report on Uu includes a list of amount of data transmitted and received via Uu with timestamp, a source ID, a destination ID and the UE location.

Step 5-7: The PCF 12 contacts the CHF 13 to create a CDR. The CHF 13 can cross-check the usage information report from different UEs.

Example Aspect 5-2: UE Reporting Via AMF to CHF when the Criteria is Met

The main idea of this solution is that the UE application layer triggers the UE 3 to collect and report its usage information on both Uu and PC5. In this Example Aspect, the UE reporting to the CHF 13 is via the AMF 11 when the criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Figure 10:
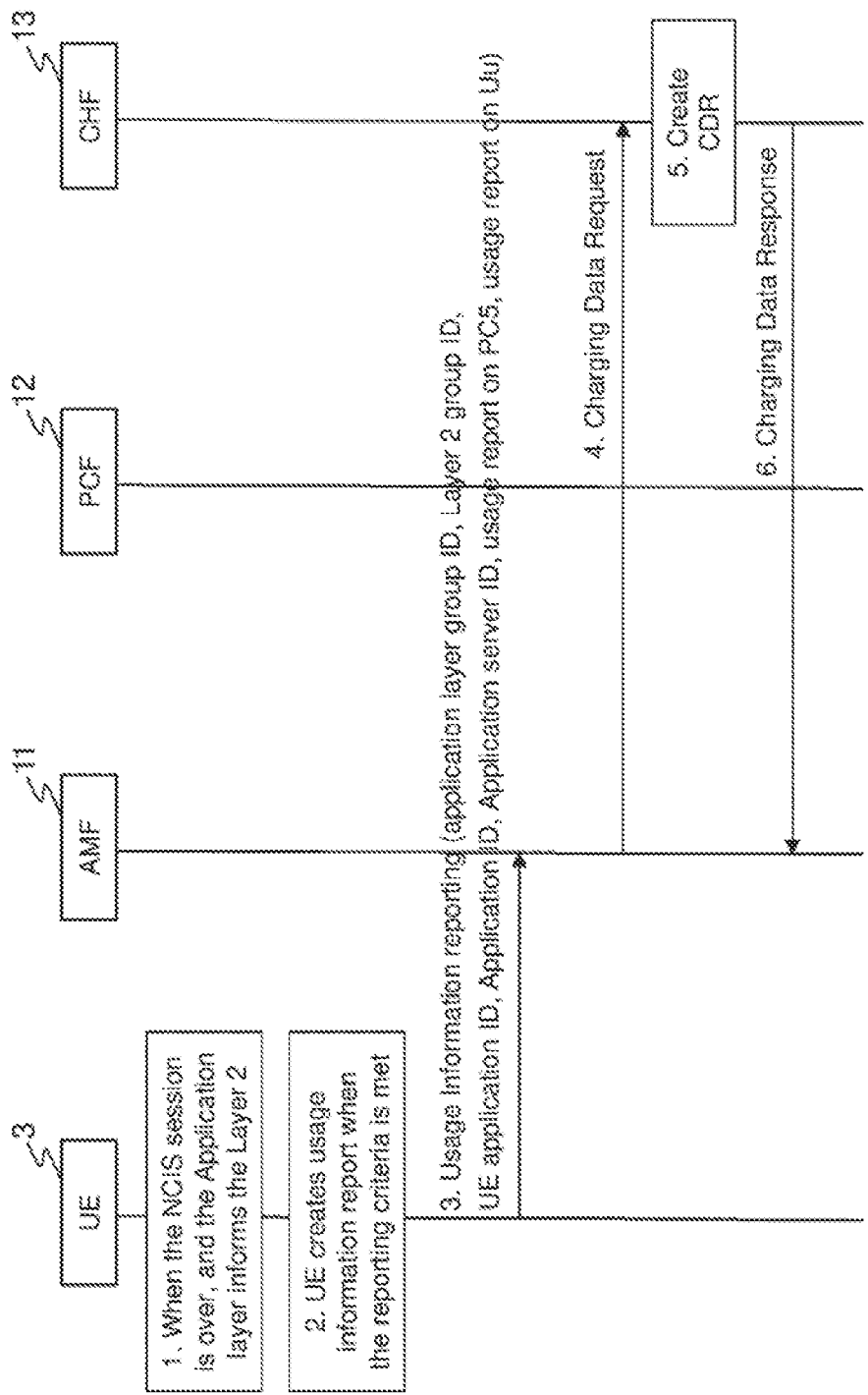
FIG. 10 illustrates schematically an exemplary procedure in which the UE application layer triggers the UE 3 to collect and report its usage information on both Uu and PC5 via the AMF 11.

FIG. 10 illustrates schematically an exemplary procedure in which the UE application layer triggers the UE 3 to collect and report its usage information on both Uu and PC5 via the AMF 11.

Step 1: UE's Application Layer informs its Layer 2 when the NCIS session is over.

Step 2: The UE 3 creates a usage information report when the reporting criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Step 3: The UE 3 invokes the usage reporting procedure or any other service procedure or sends, to the AMF 11, a Usage Information Reporting Message to report, to the network, a UE's usage information report. The usage information report has an Application Layer Group ID, an Application ID, a Layer 2 Group ID, a UE Application ID, an Application Server ID, a Usage Report on PC5, a Usage Report on Uu, and other kinds of relevant usage parameters. The usage report on PC5 includes a list of amount of data transmitted and received via PC5 with timestamp, a source ID, a destination ID and the UE location. The usage report on Uu includes a list of amount of data transmitted and received via Uu with timestamp, a source ID, a destination ID and the UE location.

Step 4-6: The AMF 11 contacts the CHF 13 to create a CDR. The CHF 13 can cross-check the usage information report from different UEs.

In this solution, the UE application layer triggers the UE 3 to collect and report its usage information. As its result, it allows the network to charge UE's usage accurately and flexibly.

Solution 6 UE Reporting Charging on PC5 Via SMF

Example Aspect 6-1: UE Reporting Charging on PC5 Via SMF

The main idea of this solution is that the SMF 15 exchanges messages with the CHF 13 for usage information collection and reporting.

Figure 11:
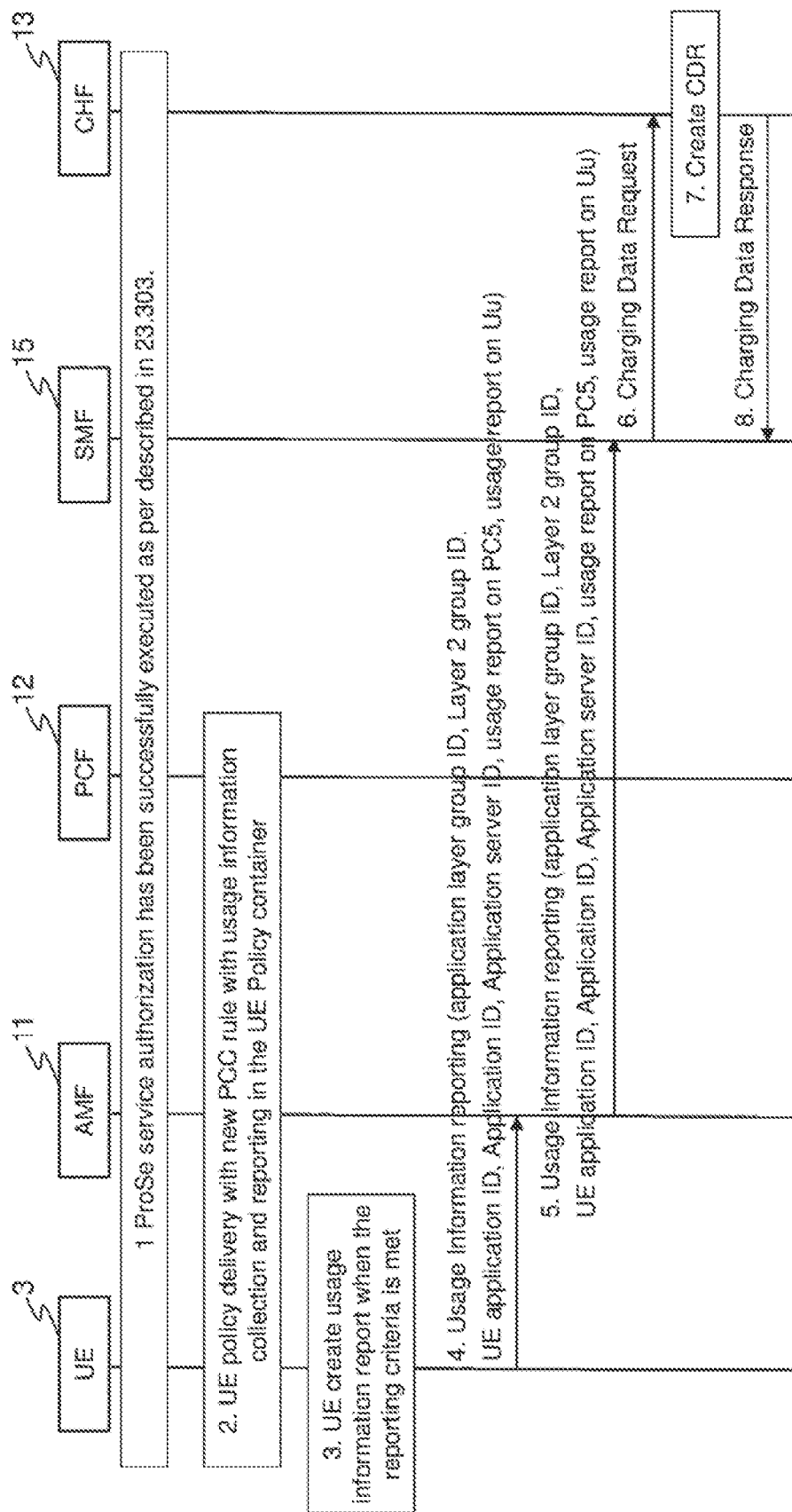
FIG. 11 illustrates schematically an exemplary procedure in which SMF 15 exchanges messages with CHF 13 for usage information collection and reporting.

FIG. 11 illustrates schematically an exemplary procedure in which the SMF 15 exchanges messages with the CHF 13 for usage information collection and reporting.

Step 1: ProSe service authorization has been successfully executed as per described in 3GPP TS 23.303. Although in the present example a ProSe Function is used, it will be appreciated that the functionalities of the ProSe Function may be provided by the PCF 12 (or another node responsible for proximity services).

Step 2: If the UE 3 is in CM-CONNECTED, the UE policy delivery with new PCC rules with usage information collection and reporting is in the UE Policy container. The AMF 11 transfers transparently the UE Policy container received from the PCF 12 to the UE 3. The usage information collection and reporting includes usage information reporting criteria and usage information measurement, which has an Application Layer Group ID, a Layer 2 group ID, a UE application ID, an Application ID, an Application Server ID, a Usage Report on PC5 Indicator, a Usage Report on Uu indicator, and other kinds of relevant usage parameters.

Step 3: The UE 3 creates a usage information report when the reporting criteria is met. For example, the criteria can be that the configured collection period for usage information has elapsed. As another example, when the UE 3 is out of RAN coverage, the UE 3 generates reports from the recorded usage information every collection period and stores the non-empty reports, and sends the reports once the UE 3 returns to coverage.

Step 4-5: The UE 3 invokes the usage reporting procedure or any other service procedure or sends, to the SMF 15, a Usage Information Reporting Message via the AMF 11 to report the network UE's usage information report. The usage information report has an Application Layer Group ID, an Application ID, a Layer 2 Group ID, a UE Application ID, an Application Server ID, a Usage Report on PC5, a Usage Report on Uu, and other kinds of relevant usage parameters. The usage report on PC5 includes a list of amount of data transmitted and received via PC5 with timestamp, a source ID, a destination ID and the UE location. The usage report on Uu includes a list of amount of data transmitted and received via Uu with timestamp, a source ID, a destination ID and the UE location.

Step 6-8: The SMF 15 contacts the CHF 13 to create a CDR. The CHF 13 can cross-check the usage information report from different UEs.

In this solution, the SMF 15 exchanges messages with the CHF 13 for usage information collection and reporting. As its result, it allows the network to charge UE's usage accurately and flexibly.

Summary

Beneficially, the above described example embodiments include, although they are not limited to, one or more of the following functionalities:
1) The proposed 5GS-based new charging solution allows the UE to report its usages on both PC5 and Uu interfaces to the network, which currently relies on the SMF/UPF to provide usage information on Uu interface only. It fills the gap that there is no usage reporting on PC5 interface in 5GS.
2) The LTE-based ProSe charge solution cannot be used in 5GS straight forward, and the proposed 5GS-based new charging solution is based on the service-based architecture in 5GS.
3) The new usage information reporting message can be triggered by the AF/the network/the application layer, which allows the AF and the network to flexibly obtain real-time charging information on the D2D direct communication.
4) New PCC rules, new triggers and new measurement for monitoring and reporting UE usage allow the network to charge UE's usage accurately and flexibly.
5) The AF can subscribe the charging policy from the PCF, who performs the UE configuration update procedure to deliver the charging policy to the UE.
6) The AF can enforce the charging policy to the PCF, who performs the UE configuration update procedure to deliver the charging policy to the UE.

The CHF can cross-check the usage information report from different UEs. It reduces the chance of "fraud" usage reporting.

In order to provide these functionalities, the above example aspects describe exemplary methods comprising (at least some of) the following steps:
1) NAS messages "Usage information reporting request/response" is used for UE usage information reporting, which enable on-demand request from the AF/PCF.
2) PCC rules for usage information collection and reporting includes charging rules for PC5 and Usage Monitoring and Reporting rules for PC5.
3) Pre-configured usage information collection and reporting for PC5 is used for NCIS.
4) Measurements monitoring UE usage, which classifies the data flow usage on PC5 and Uu, respectively, and adds NCIS related parameters, such as an application layer group ID, a Layer 2 group ID, a UE application ID, an Application ID, and an Application server ID, is used. Both usage reports on PC5 and Uu have lists of amount of data transmitted and received with timestamp, a source ID, a destination ID and the UE location.

UE usage information reporting triggers, which can be based on AF's request or AF's subscription or UE's application layer message, are used for charging and usage reporting for NCIS in the D2D direct communication.

Benefits

New charging solutions are proposed for D2D direct communication based on 5GS. By using these solutions, it allows the network to charge UE usage accurately and flexibly.

System Overview

Figure 12:
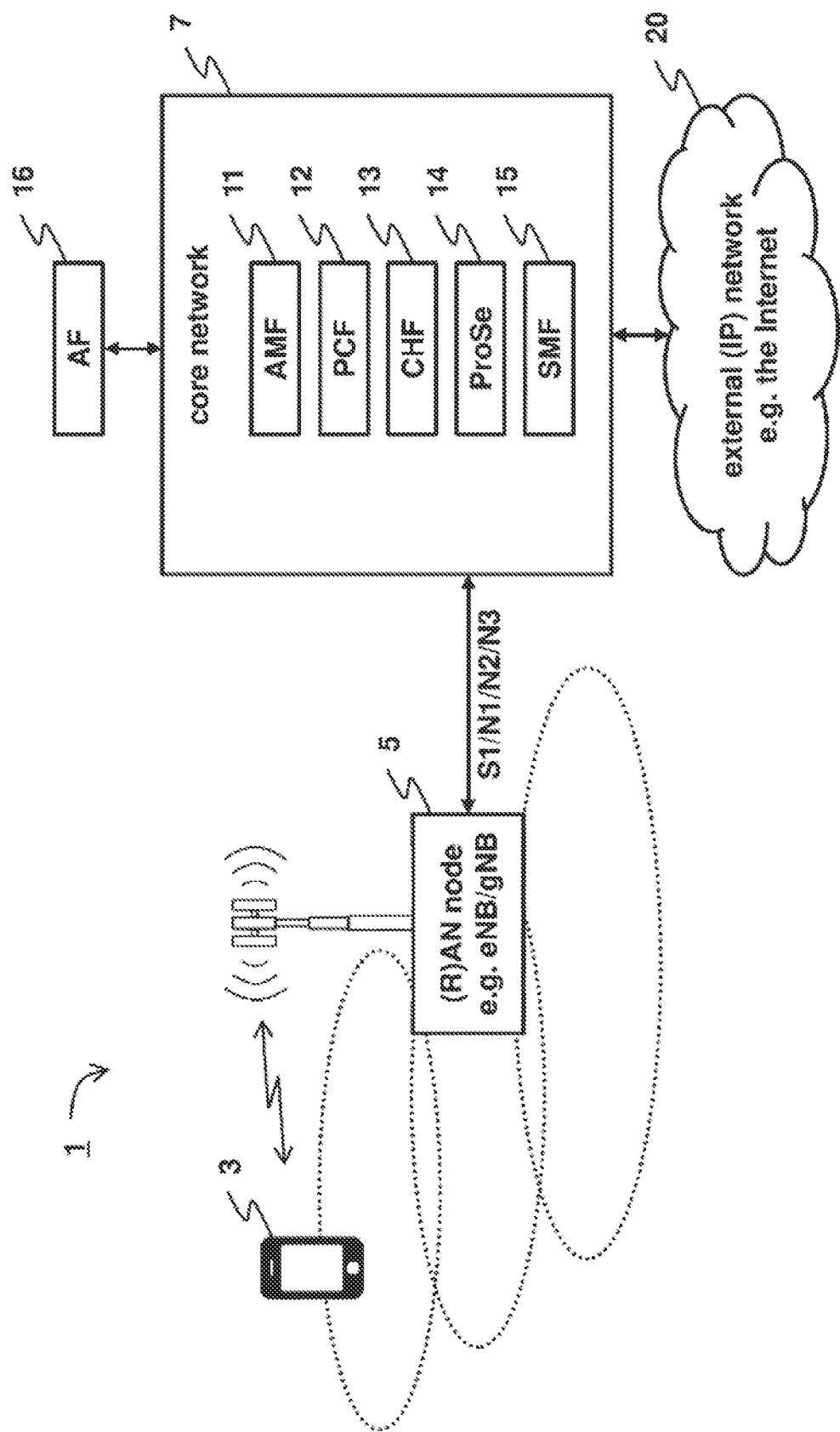
FIG. 12 schematically illustrates a mobile (cellular or wireless) telecommunication system 1 to which the above example embodiments are applicable.

FIG. 12 schematically illustrates a mobile (cellular or wireless) telecommunication system 1 to which the above example embodiments are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 12 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) and user plane functions (UPFs). It will be appreciated that the core network 7 may also include, amongst others: an Access and Mobility Management Function (AMF) 11; a Policy Control Function (PCF) 12, a Charging Function (CHF) 13, a ProSe Function 14; and a Session Management Function (SMF) 15. It will be appreciated that in some systems (e.g. 3GPP Release 16 and onwards) the functionalities of the ProSe Function 14 may be provided by the PCF 12 (or another suitable node). Accordingly, whenever the present description refers to actions performed by the ProSe Function 14, it is intended to cover the same actions being performed by the PCF 12, when appropriate.

An Application Function (AF) 16 may also be provided within the core network 7 or coupled to the core network 7. From the core network 7, connection to an external IP network 20 (such as the Internet) is also provided.

The components of this system 1 are configured to perform one or more of the above described exemplary embodiments.

User Equipment (UE)

Figure 13:
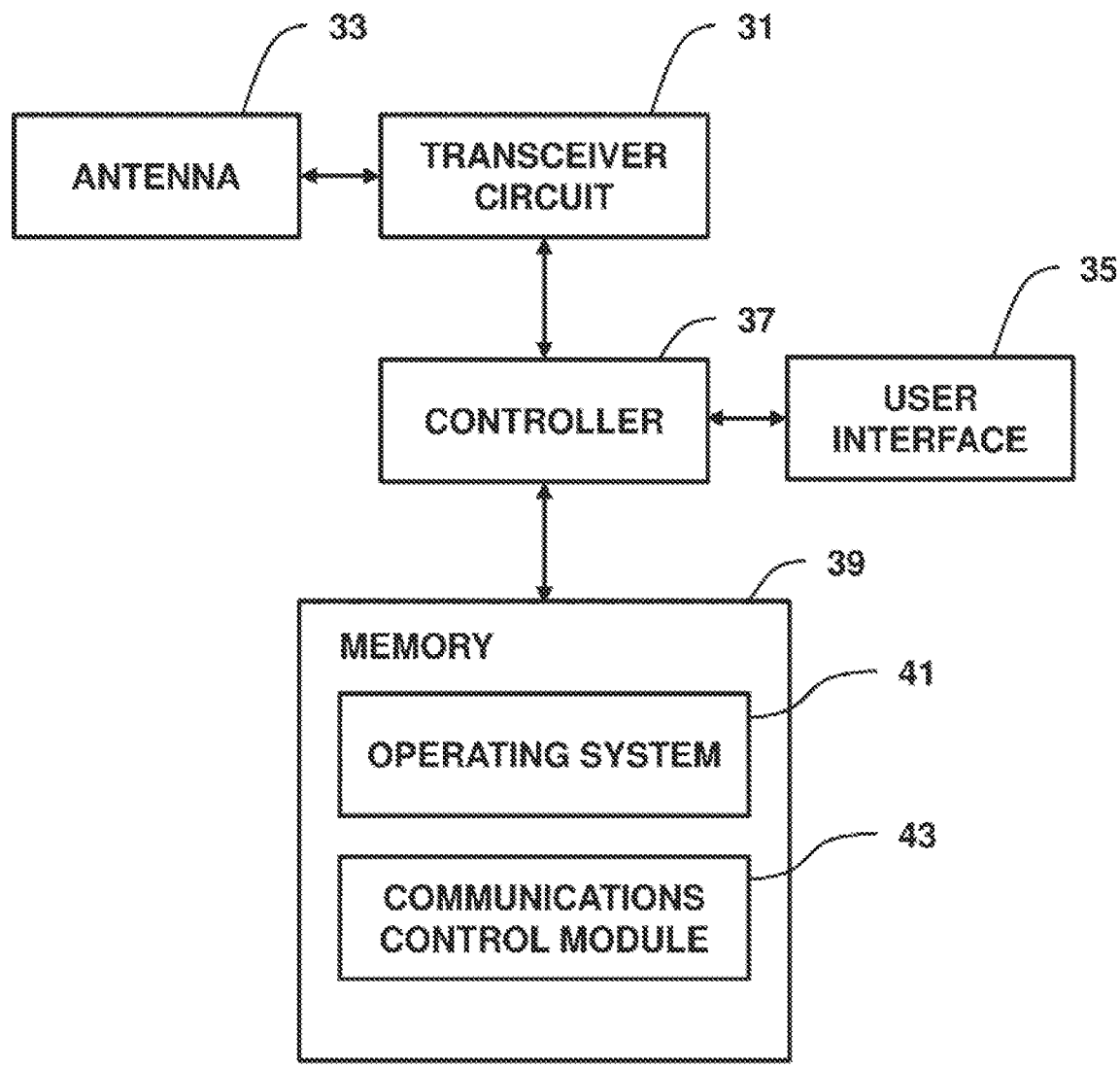
FIG. 13 is a block diagram illustrating the main components of a UE (mobile device 3) shown in FIG. 12.

FIG. 13 is a block diagram illustrating the main components of the UE (mobile device 3) shown in FIG. 12. As shown, the UE includes a transceiver circuit 31 which is operable to transmit signals to and to receive signals from the connected node(s) via one or more antenna 33. Although not necessarily shown in FIG. 13, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5, core network nodes, and application functions. Such signaling includes appropriately formatted requests and responses relating to charging for device-to-device communications.

(R)AN Node

Figure 14:
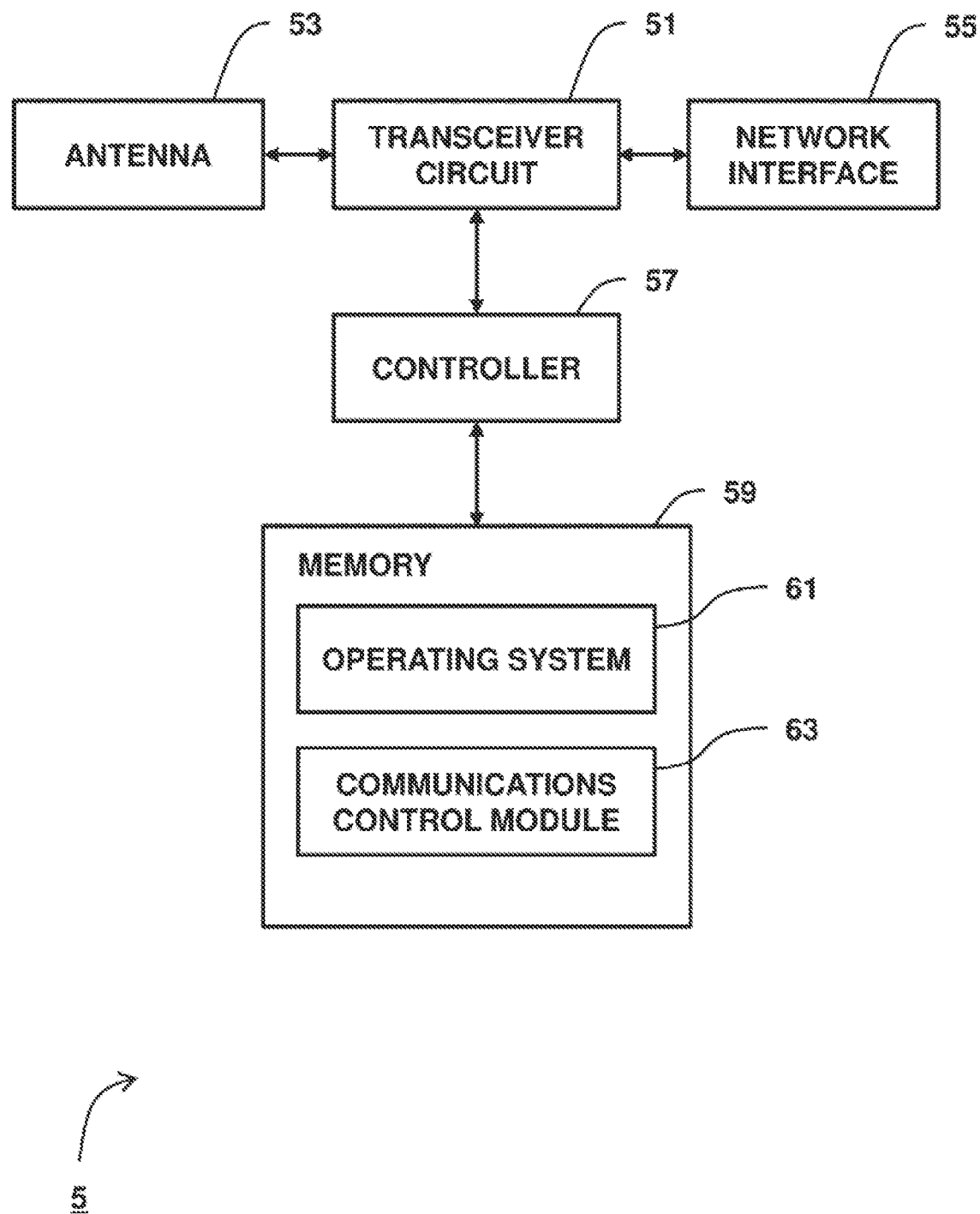
FIG. 14 is a block diagram illustrating the main components of an exemplary (R)AN node 5 (base station) shown in FIG. 12.

FIG. 14 is a block diagram illustrating the main components of an exemplary (R)AN node 5 (base station) shown in FIG. 12. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes/application functions. Such signaling includes appropriately formatted requests and responses relating to charging for device-to-device communications.

Core Network Node

Figure 15:
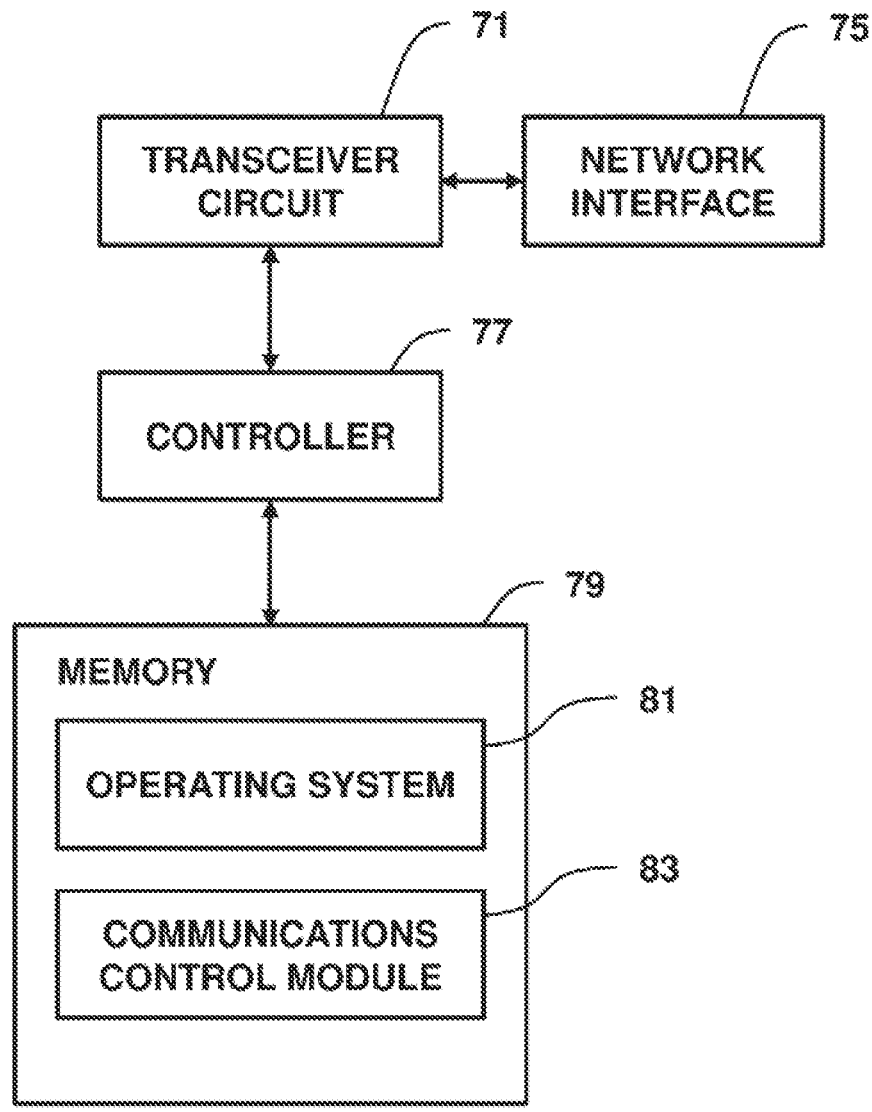
FIG. 15 is a block diagram illustrating the main components of a generic core network node (or function) shown in FIGS. 1 to 12.

FIG. 15 is a block diagram illustrating the main components of a generic core network node (or function) shown in FIGS. 1 to 12, for example, the AMF 11, the PCF 12, the CHF 13, the ProSe Function 14, and the SMF 15. It will be appreciated that the same block diagram may be applicable to the AF 16 as well. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, the AFs 16, and other core network nodes. Such signaling includes appropriately formatted requests and responses relating to charging for device-to-device communications.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above example embodiments are also applicable to 'non-mobile' or generally stationary user equipment.

Various other modifications will be apparent to those skilled in the art and will not be described in further detail here.

Abbreviations and Terminology

3GPP 3rd Generation Partnership Project
5GC 5G Core Network
5GS 5G System
5G-AN5G Access Network
AF Application Function
AMF Access and Mobility Management Function
AN Access Network
CHF Charging Function
CM-CONNECTED Connection Management—CONNECTED State
CM-IDLE Connection Management—IDLE State
D2D Device to device
DNN Data Network Name
GFBR Guaranteed Flow Bit Rate
MM Mobility Management
N1 Reference point between the UE and the Access and Mobility Management function
N2 Reference point between the (R)AN and the Access and Mobility Management function
NAS Non-Access-Stratum
NCIS Network Controlled Interactive Service NF Network Function
NG Next Generation
NG-RAN Next Generation-Radio Access Network
OAM Operations, Administration and Maintenance
OTT Over the Top
PC3 The reference point between the UE and the ProSe Function
PC5 The reference point between ProSe-enabled UEs used for control and user plane for ProSe Direct Discovery, ProSe Direct Communication and ProSe UE-to-Network Relay
PCC Policy and Charging Control
PCF Policy Control Function
PDB Packet Delay Budget
PDU Protocol Data Unit
PER Packet Error Rate
ProSe Proximity-based Service
QFI QoS Flow Identifier
RAN Radio Access Network
RRC Radio Resource Control
SBA Service-based Architecture
SM Session Management
SMF Session Management Function
UE User Equipment
UPF User Plane Function
Uu The reference point between the UE and the radio access network
V2X Vehicle-to-everything List All References Stated in the Present Specification

[1] 3GPP TS 23.501 V16.1.0
[2] 3GPP TS 23.502 V16.1.0
[3] 3GPP TS 23.503 V16.1.0
[4] 3GPP TS 23.303 V15.1.0
[5] 3GPP TS 32.277 V15.1.0

This application is based upon and claims the benefit of priority from European Patent Application No. 19200645.0, filed on Sep. 30, 2019, the disclosure of which are incorporated herein in their entirety by reference.

REFERENCE SIGNS LIST

1 TELECOMMUNICATION SYSTEM
3 MOBILE DEVICE (UE)
31 TRANSCEIVER CIRCUIT
33 ANTENNA
35 USER INTERFACE
37 CONTROLLER
39 MEMORY
41 OPERATING SYSTEM
43 COMMUNICATION CONTROL MODULE
5 (R)AN NODE (GNB/ENB)
51 TRANSCEIVER CIRCUIT
53 ANTENNA
55 NETWORK INTERFACE
57 CONTROLLER
59 MEMORY
61 OPERATING SYSTEM
63 COMMUNICATION CONTROL MODULE
7 CORE NETWORK
11 AMF
12 PCF
13 CHF
14 PROSE FUNCTION
15 SMF
16 AF (PROSE APPLICATION SERVER)
71 TRANSCEIVER CIRCUIT
75 NETWORK INTERFACE
77 CONTROLLER
79 MEMORY
81 OPERATING SYSTEM
83 COMMUNICATION CONTROL MODULE
20 EXTERNAL IP NETWORK

The invention claimed is:

1. A method for a user equipment (UE), the method comprising:
receiving, from a Policy Control Function (PCF) node in a core network via an Access and Mobility Management Function (AMF) node, UE policy information related to Proximity-based service (ProSe) usage reporting; and
updating the UE policy information received.

2. A user equipment (UE) comprising:
a memory configured to store instructions; and
a processor configured to execute the instructions to:
receive, from a Policy Control Function (PCF) node in a core network via an Access and Mobility Management Function (AMF) node, UE policy information related to a PC5 usage report; and
update the UE policy information received.

3. The method according to claim 1, further comprising: transmitting PC5 charging report information to the AMF node according to the UE policy information.

* * * * *